(12) United States Patent
Kim et al.

(10) Patent No.: US 9,997,904 B2
(45) Date of Patent: Jun. 12, 2018

(54) METHOD FOR CONTROLLING TRIP EVENT OF INVERTER

(71) Applicant: LSIS CO., LTD., Gyeonggi-do (KR)

(72) Inventors: Hong-Seok Kim, Gyeonggi-do (KR); Chun-Suk Yang, Gyeonggi-do (KR)

(73) Assignee: LSIS CO., LTD., Anyang-si, Gyeonggi-Do (KR)

( * ) Notice: Subject to any disclaimer, the term of this patent is extended or adjusted under 35 U.S.C. 154(b) by 227 days.

(21) Appl. No.: 15/016,185

(22) Filed: Feb. 4, 2016

(65) Prior Publication Data

US 2016/0248245 A1    Aug. 25, 2016

(30) Foreign Application Priority Data

Feb. 25, 2015  (KR) .................. 10-2015-0026340

(51) Int. Cl.
| | |
|---|---|
| *H02H 7/00* | (2006.01) |
| *H02H 7/122* | (2006.01) |
| *H02M 7/537* | (2006.01) |
| *H02H 3/08* | (2006.01) |
| *H02H 3/093* | (2006.01) |

(52) U.S. Cl.
CPC .............. *H02H 7/122* (2013.01); *H02H 3/08* (2013.01); *H02H 7/1227* (2013.01); *H02M 7/537* (2013.01); *H02H 3/085* (2013.01); *H02H 3/093* (2013.01)

(58) Field of Classification Search
CPC ...................................................... H02H 7/122
See application file for complete search history.

(56) References Cited

U.S. PATENT DOCUMENTS

| | | |
|---|---|---|
| 4,980,624 A | 12/1990 | Bernhardt |
| 5,394,287 A | 2/1995 | Hiroshi et al. |
| | (Continued) | |

FOREIGN PATENT DOCUMENTS

| | | |
|---|---|---|
| CN | 1035392 A | 9/1989 |
| CN | 1682424 A | 10/2005 |
| | (Continued) | |

OTHER PUBLICATIONS

Japanese Office Action dated Mar. 14, 2017 in connection with the counterpart Japanese Patent Application.

(Continued)

*Primary Examiner* — Stephen W Jackson
(74) *Attorney, Agent, or Firm* — K&L Gates LLP

(57) ABSTRACT

Disclosed herein is a method for controlling a trip event of an inverter by taking into account the temperature of the inverter. The method includes: sensing a change in temperature of the inverter for an overload current measurement time using the temperature sensing circuit; determining an amount of heat emitted from the inverter based on the change in temperature; determining an electrical energy of the inverter consumed for the overload current measurement time; determining a compensation reference time based on the amount of heat and the electrical energy; and comparing the compensation reference time with the overload current measurement time to trip the inverter. As a result, the actual temperature of the inverter measured when the inverter is in operation is reflected, so that the trip event of the inverter can be controlled more accurately.

7 Claims, 6 Drawing Sheets

(56) References Cited

U.S. PATENT DOCUMENTS

| | | | | |
|---|---|---|---|---|
| 7,715,214 B2* | 5/2010 | Kishimoto | ............ | H02H 7/0844 363/56.02 |
| 9,751,409 B2* | 9/2017 | Ozaki | ....................... | B60L 3/06 |
| 2014/0376587 A1* | 12/2014 | Sakashita | .............. | B60W 10/08 374/1 |

FOREIGN PATENT DOCUMENTS

| | | | |
|---|---|---|---|
| CN | 103972605 | A | 8/2014 |
| CN | 104114987 | A | 10/2014 |
| JP | H5-292656 | A | 11/1993 |
| JP | H7255166 | A | 10/1995 |
| JP | H9-9684 | | 1/1997 |
| JP | H11-113163 | A | 4/1999 |
| JP | 2002-302359 | A | 10/2002 |
| JP | 2004-64977 | A | 2/2004 |
| JP | 2006025493 | A | 1/2006 |
| JP | 2006-211886 | A | 8/2006 |
| JP | 2009-261078 | A | 11/2009 |
| JP | 2015-6074 | A | 1/2015 |
| KR | 2008-0104869 | A | 12/2008 |

OTHER PUBLICATIONS

European Search Report for Application No. 16150168.9 dated Jul. 21, 2016 in 8 pages.
Chinese Office Action for related Chinese Application No. 201610060457.0; dated Dec. 20, 2017; (8 pages).

* cited by examiner

PRIOR ART

METHOD FOR CONTROLLING TRIP EVENT OF INVERTER

CROSS REFERENCE TO RELATED APPLICATION

This application claims the benefit of Korean Patent Application No. 10-2015-0026340, filed on Feb. 25, 2015, entitled "METHOD FOR CONTROLLING TRIP EVENT OF INVERTER", which is hereby incorporated by reference in its entirety into this application.

BACKGROUND

Technical Field

The present disclosure relates to a method for controlling a trip event of an inverter, and more specifically to a method for controlling a trip event of an inverter by taking into account the temperature of the inverter.

Description of the Related Art

An inverter includes circuitry that converts an AC voltage to a DC voltage, switches the converted DC voltage by a switching element according to a pulse width modulation (PWM) signal to generate an AC voltage, and output the generated AC voltage to a load. Such an inverter allows a user to supply an AC voltage having a desirable level and frequency to the load, thereby precisely controlling the load.

In operating an inverter, if an overcurrent flows in the inverter, the temperature of the inverter increases and thus the inverter overheats. If the inverter overheats, a trip event occurs for protecting the inverter. Once a trip event occurs, the inverter is interrupted. There are several ways to control a trip event of an inverter. For example, there is known a latch-type control scheme by which a trip event once occurred due to overheating can be cancelled only by resetting. In addition, there is known a level-type control scheme by which a trip event is automatically cancelled if overheating is gone.

For an inverter using the latch-type control scheme, when a trip event occurs due to overheating, a user has to perform a reset operation by herself/himself. Accordingly, it is necessary to prevent an unnecessary trip event. According to existing trip control schemes, however, it is determined whether a trip event has occurred based on an estimated temperature of the inverter, instead of an actually measured temperature. As a result, it is difficult to accurately control a trip event.

SUMMARY

An aspect of the present disclosure is to provide a method for controlling a trip event of an inverter that reflects an actual temperature of the inverter measured when the inverter is in operation, so that the trip event of the inverter can be controlled more accurately.

Another aspect of the present disclosure is to provide a method for controlling a trip event of an inverter that reflects an actual temperature of the inverter to thereby improve trip points of the inverter, so that unnecessary trip events can be reduced and trip points can be earlier, thereby preventing damage to the inverter when the inverter is overheating.

Other objects of the present disclosure are not limited to the above-described object and other objects and advantages can be appreciated by the following description described with reference to the embodiments of the present disclosure. Further, it will be easily appreciated that the objects and advantages of the present disclosure can be realized by means and a combination thereof recited in the appended claims.

In accordance with one aspect of the present disclosure, a method for controlling a trip event of an inverter includes: sensing a change in temperature of the inverter for an overload current measurement time using the temperature sensing circuit; determining an amount of heat emitted from the inverter based on the change in temperature; determining an electrical energy of the inverter consumed for the overload current measurement time; determining a compensation reference time based on the amount of heat and the electrical energy; and comparing the compensation reference time with the overload current measurement time to trip the inverter.

BRIEF DESCRIPTION OF THE DRAWINGS

The above and other aspects, features and advantages of the disclosure will become apparent from the following description of embodiments given in conjunction with the accompanying drawings, in which.

DETAILED DESCRIPTION

Figure 1:
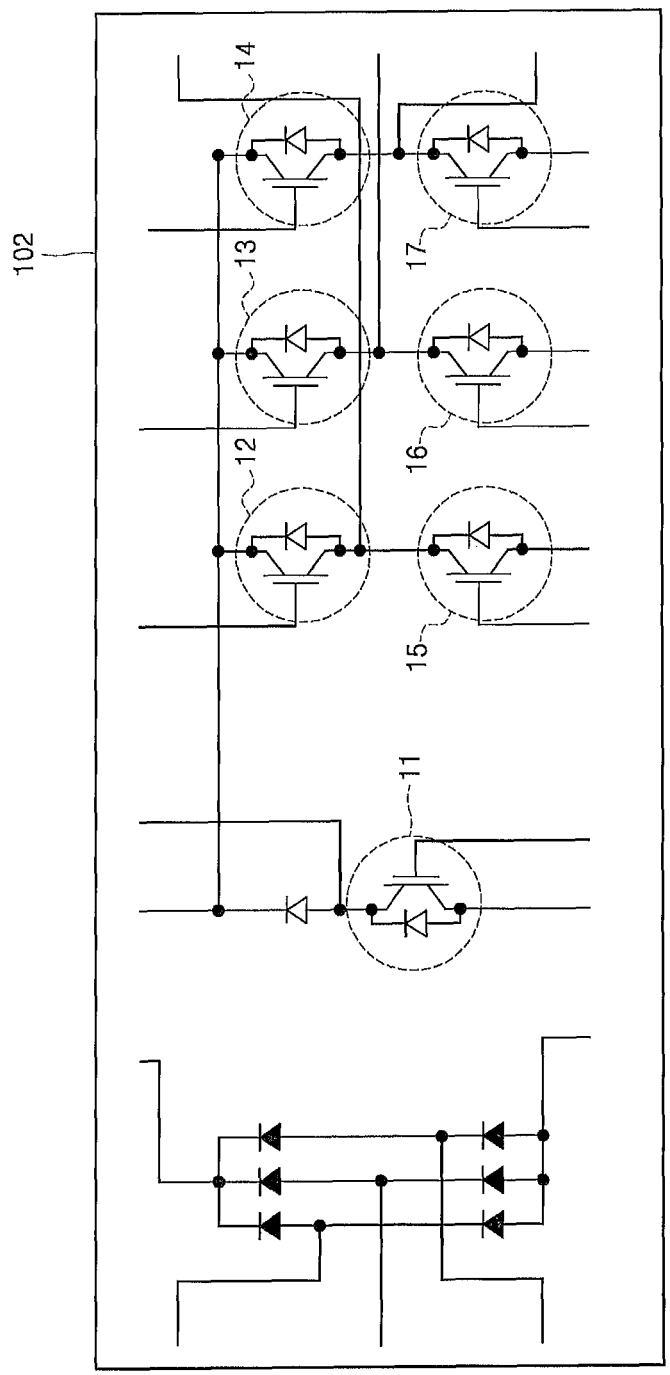
FIG. 1 is a circuit diagram of a power module of an inverter to which a method for controlling a trip event of an inverter according to an embodiment of the present disclosure.

The above objects, features and advantages will become apparent from the detailed description with reference to the accompanying drawings. Embodiments are described in sufficient detail to enable those skilled in the art in the art to easily practice the technical idea of the present disclosure. Detailed disclosures of well known functions or configurations may be omitted in order not to unnecessarily obscure the gist of the present disclosure. Hereinafter, embodiments of the present disclosure will be described in detail with reference to the accompanying drawings. Throughout the drawings, like reference numerals refer to like elements.

FIG. 1 is a circuit diagram of a power module responsible for supplying power to an inverter to which a method for controlling a trip event of an inverter according to an embodiment of the present disclosure.

As shown in FIG. 1, an inverter 102 includes a plurality of switching elements 11 to 17. The switching elements used in the inverter 102 may include, but is not limited to, insulated gate bipolar mode transistors (IGBTs). The switching elements 11 to 17 are repeatedly turned on and off to thereby convert a DC voltage to an AC voltage. The larger the number of switching of the switching elements 11 to 17 for a given period of time is, i.e., the higher the switching frequency of the switching elements 11 to 17 is, the more the switching elements 11 to 17 emit heat. Accordingly, the temperature of the inverter 102 increases accordingly.

Figure 2:
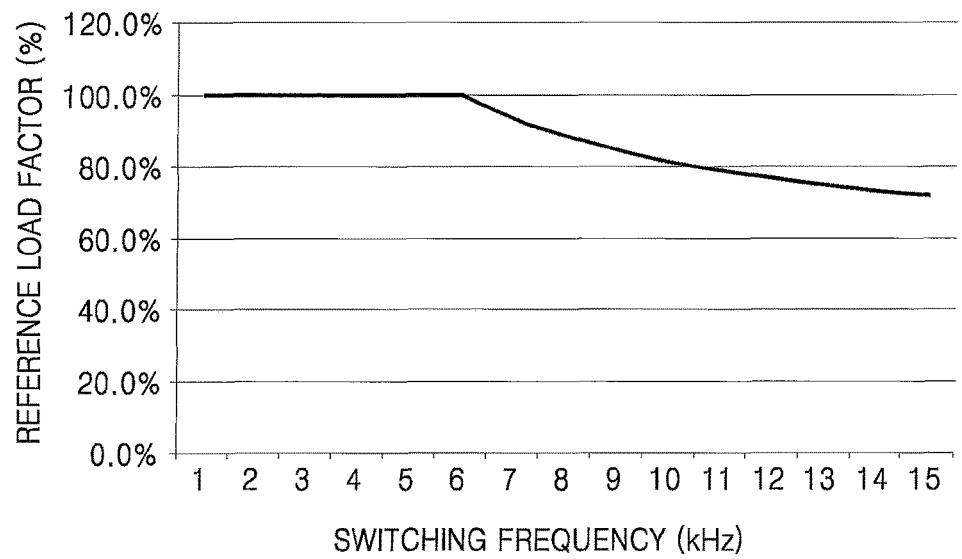
FIG. 2 is a graph showing change of a reference load factor versus switching frequency of the switching elements included in the inverter of FIG. 1 according to an embodiment of the present disclosure.

FIG. 2 is a graph showing change of a reference load factor versus switching frequency of the switching elements included in the inverter of FIG. 1 according to an embodiment of the present disclosure.

According to an embodiment of the present disclosure, the inverter 102 compares an actual load factor $Io/I_{ref}$ to the reference load factor and determines whether to trip the inverter 102 based on a result of the comparing. As used herein, an actual load factor is defined as a ratio of an output current Io flowing in a switching element to a rated current $I_{ref}$ of the inverter 102. The reference load factor is a criterion value for determining whether to trip an inverter. Default reference load factor is 100%.

As described above, the amount of heat emitted from a switching element increases with its switching frequency. Accordingly, as shown in FIG. 2, when the switching frequency exceeds a reference frequency, e.g., 6 kHz, the reference load factor is adjusted so that it becomes lower than 100%.

Figure 3:
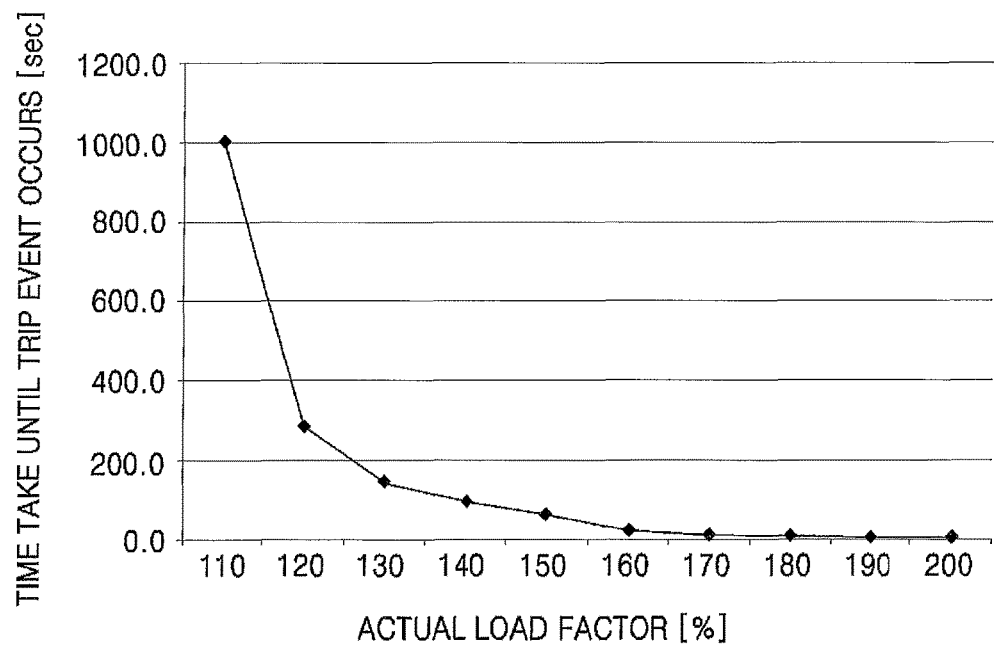
FIG. 3 is a graph showing time taken until a trip event occurs versus actual load factor of an inverter according to an embodiment of the present disclosure.

FIG. 3 is a graph showing time taken until a trip event occurs versus actual load factor of an inverter according to an embodiment of the present disclosure.

As described above with respect to FIG. 2, the reference load factor is determined depending on the switching frequency of a switching element. In addition, as described above, the actual load factor $I_o/I_{ref}$ of the inverter 102 is compared to the reference load factor, and it is determined whether and when to trip the inverter 102 (trip point) based on a result of the comparing. As shown in FIG. 3, the higher the actual load factor $I_o/I_{ref}$ is, the earlier the trip event occurs.

Figure 4:
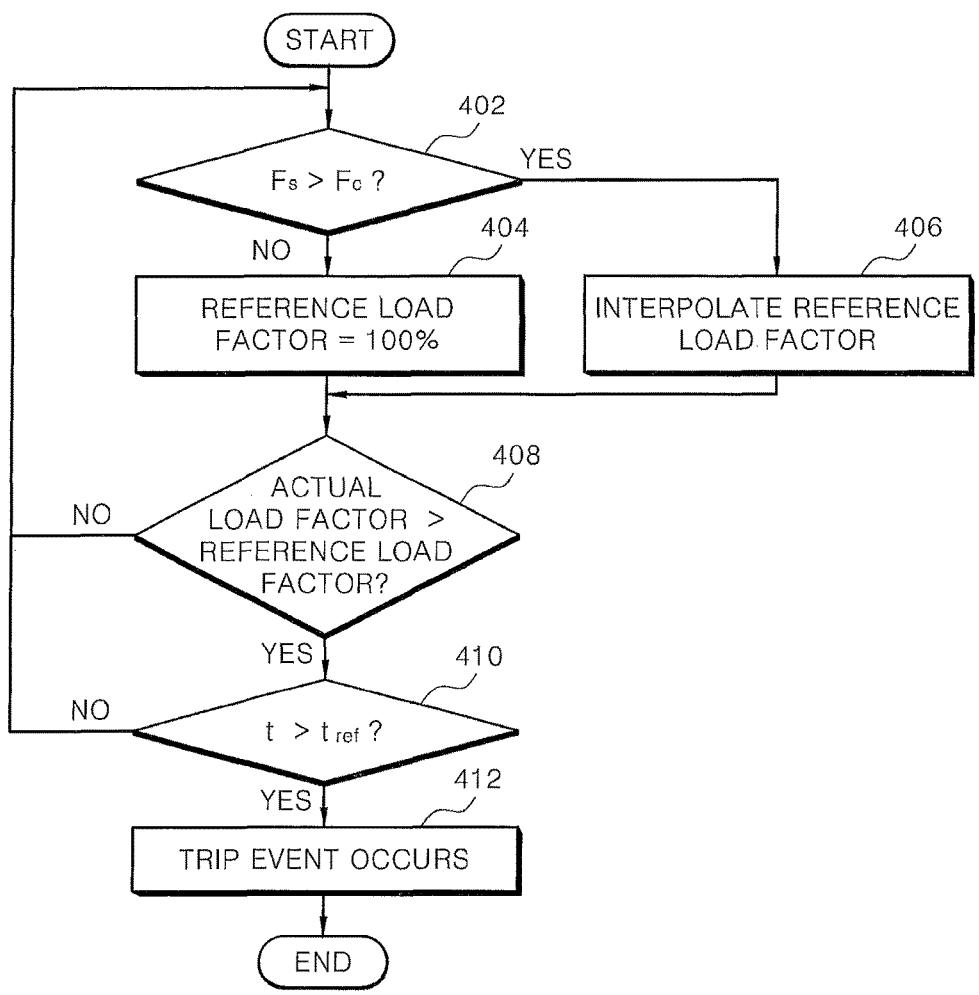
FIG. 4 is a flow chart for illustrating a method for controlling a trip event of an inverter in the related art.

FIG. 4 is a flow chart for illustrating a method for controlling a trip event of an inverter in the related art.

Referring to FIG. 4, the switching frequency $f_s$ of a switching element included in an inverter is compared to a reference frequency $f_c$ of the inverter (step S402). The reference frequency $f_c$ is a criterion value for determining whether the inverter overheats due to the switching frequency $f_s$ of the switching element, and may be given arbitrarily. When the switching frequency $f_s$ is not greater than the reference frequency $f_c$, the reference load factor is set to a predetermined value, e.g., 100% (step S404). On the other hand, when the switching frequency $f_s$ is greater than the reference frequency $f_c$, the reference load factor is interpolated according to a predetermined ratio (step S406).

Then, the reference load factor determined in step S404 or S406 is compared to an actual load factor $I_o/I_{ref}$ which is a ratio of an output current $I_o$ flowing in the switching element to a rated current $I_{ref}$ of the inverter (step S408). If it is determined that the actual load factor $I_o/I_{ref}$ is not greater than the reference load factor, it returns to step S402 without performing a trip control process. On the other hand, if it is determined in step S408 that the actual load factor $I_o/I_{ref}$ is greater than the reference load factor, which means that the inverter overheats, an overload current measurement time t is compared with a trip point reference time $t_{ref}$ (step S410), such that trip control is performed. The overload current measurement time t refers to a time period for which an output current Io flows in a switching element. The trip point reference time $t_{ref}$ is defined as follows:

$$t_{ref} = E_{ref}/(C \times I_o^2) \quad \text{[Mathematical Expression 1]}$$

where $t_{ref}$ denotes trip point reference time, $E_{ref}$ denotes reference energy for determining whether to trip, C denotes a proportional constant, and $I_o$ denotes an output current flowing in a switching element. Equation 1 is an equation for estimating time derived from $E[J]=I_o^2 \times R \times t$, for example, where E denotes an electrical energy and R denotes a resistance of an inverter.

If it is determined in step S410 that the overload current measurement time t is not greater than the trip point reference time $t_{ref}$, it returns to step S402 without performing trip control. If it is determined in step S410 that the overload current measurement time t is greater than the trip point reference time $t_{ref}$, the inverter is tripped (step S412), and thus the operation of the inverter is interrupted.

According to the existing method for controlling a trip event of an inverter shown in FIG. 4, the overload current measurement time t is compared to the trip point reference time $t_{ref}$, and it is determined whether the inverter overheats and whether to trip the inverter. The trip point reference time $t_{ref}$ is determined by the output current $I_o$ as expressed in Equation 1. This is based on the idea that electrical energy is defined as $E[J]=I_o^2 \times R \times t$, where R denotes a resistance of an inverter, and that the electrical energy E can be converted into the amount of heat emitted from an inverter according to the equation 1 J=0.24 cal. In this regard, the amount of heat emitted from an inverter is defined as $Q[cal]=c \times m \times \Delta t$, where c denotes a specific heat of the inverter, m denotes a mass of the inverter, and $\Delta t$ denotes a change in temperature of the inverter. In short, a change in temperature $\Delta t$ of an inverter can be estimated by converting the electrical energy E consumed by an inverter into the amount of heat Q emitted from the inverter.

That is, in the related art, a change in temperature $\Delta t$ of an inverter for an overload current measurement time t is estimated based on an electrical energy E consumed by the inverter for the overload current measurement time t, thereby controlling a trip operation. According to the method for controlling an inverter trip point in the related art, however, a trip point of an inverter cannot be controlled accurately because the change in temperature is estimated based on the output current $I_o$ rather than directly measuring the temperature of the inverter. In addition, according to the method in the related art, the electrical energy consumed by a load of an inverter is based only on a resistance as expressed in $E[J]=I_o^2 \times R \times t$. In reality, however, in an equivalent circuit, a load such as an electric motor connected to an inverter is also expressed in inductance L as well as resistance R. Therefore, the temperature estimated based on electrical energy may not accurately reflect an actual change in temperature of an inverter.

In view of this, according to an embodiment of the present disclosure, in order to directly measure a change in temperature of an inverter to reflect it in controlling a trip point of an inverter, a change in temperature of the inverter for an overload current measurement time period t is detected using a temperature sensing circuit.

Figure 5:
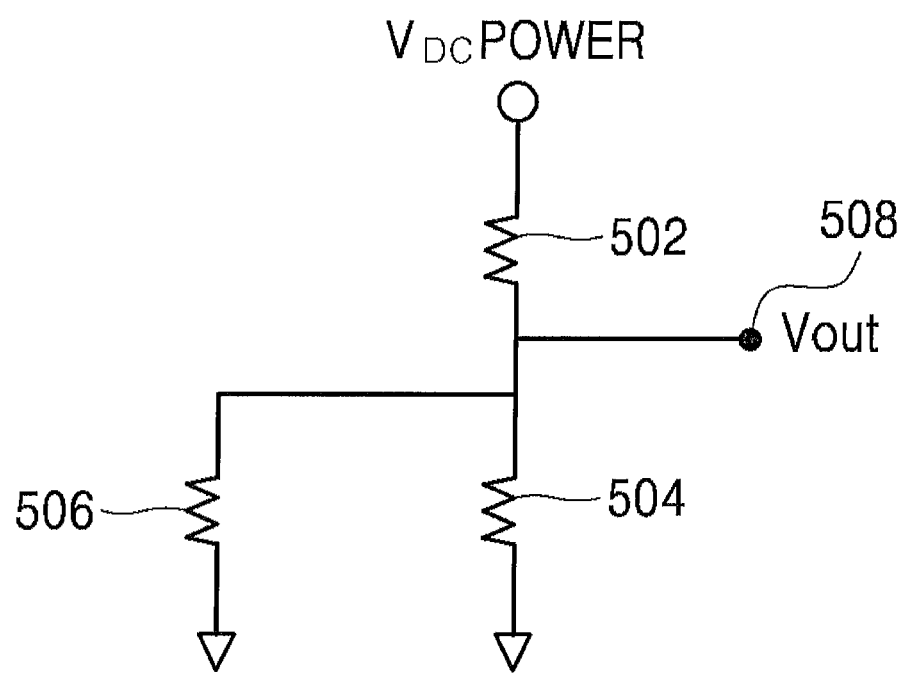
FIG. 5 is a circuit diagram of a temperature sensing circuit used for measuring a temperature of an inverter according to an embodiment of the present disclosure.

FIG. 5 is a circuit diagram of a temperature sensing circuit used for measuring a temperature of an inverter according to an embodiment of the present disclosure.

Referring to FIG. 5, the temperature sensing circuit according to the embodiment of the present disclosure includes first and second resistors 502 and 504 connected in series, and a third resistor 506 connected to the second resistor 504 in parallel. The third resistor 506 may be a variable resistor such as a negative temperature coefficient (NTC) resistor having a resistance inversely proportional to a target, i.e., a temperature of an inverter.

According to the embodiment of the present disclosure, the temperature sensing circuit shown in FIG. 5 may be used for measuring a temperature of an inverter. For example, an output voltage $V_{out}$ may be calculated as follows:

$$V_{out}=V_{DC}\times[(R2\|R3)\{(R1+(R2\|R3)\}] \quad \text{[Mathematical Expression 2]}$$

where R1 denotes a resistance of the first resistor 502, R2 denotes a resistance of the second resistor 504, and R3 denotes a resistance of the first resistor 506. In addition, it is defined that $1/(R2\|R3)=1/R2+1/R3$.

According to the embodiment of the present disclosure, the output voltage $V_{out}$ is compared to predetermined output voltage ranges shown in a table such as Table 1. Then, a temperature corresponding to an output voltage range may be determined as the temperature of the inverter. The output voltage ranges and corresponding temperatures as shown in Table 1 may differ from embodiment to embodiment.

TABLE 1

| Temperature [□] | Output Voltage $V_{out}$ Range |
|---|---|
| −20 | 2.36~2.45 |
| −10 | 2.20~2.32 |
| 0 | 1.98~2.13 |
| 10 | 1.72~1.89 |
| 20 | 1.43~1.61 |
| 30 | 1.16~1.32 |
| 40 | 0.91~1.04 |
| 50 | 0.70~0.80 |
| 60 | 0.53~0.61 |
| 70 | 0.40~0.46 |

In some embodiments, other sensing devices than the temperature sensing circuit shown in FIG. 5 may be used for measuring a temperature of the inverter.

Figure 6:
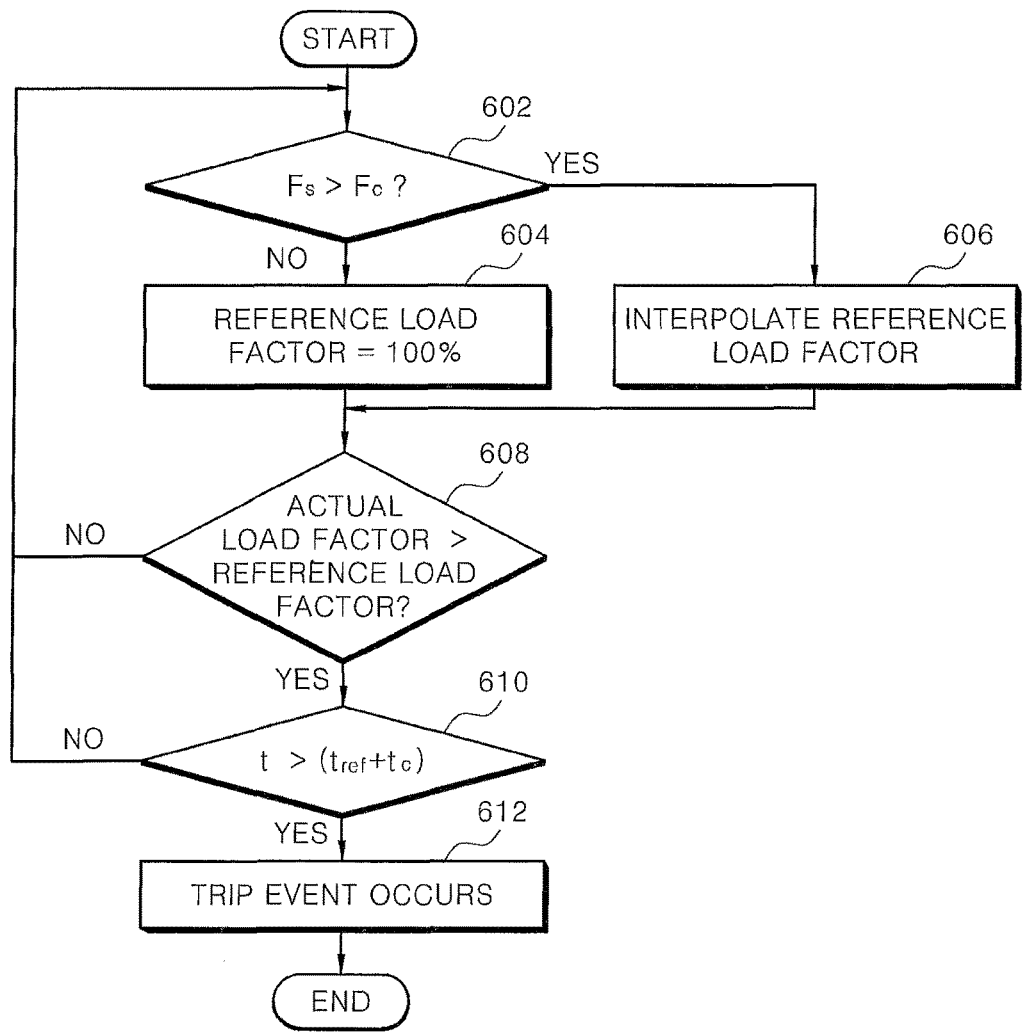
FIG. 6 is a flow chart for illustrating a method for controlling a trip event of an inverter according to an embodiment of the present disclosure.

FIG. 6 is a flow chart for illustrating a method for controlling a trip event of an inverter according to an embodiment of the present disclosure.

Referring to FIG. 6, the switching frequency $f_s$ of a switching element included in an inverter is compared to a reference frequency $f_c$ of the inverter (step S602). If the switching frequency $f_s$ is not greater than the reference frequency $f_c$, the reference load factor is set to a predetermined value, e.g., 100% (step S604). On the other hand, when the switching frequency $f_s$ is greater than the reference frequency $f_c$, the reference load factor is interpolated according to a predetermined ratio (step S606).

Then, the reference load factor determined in step S604 or S606 is compared to an actual load factor $I_o/I_{ref}$ which is a ratio of an output current $I_o$ flowing in the switching element to a rated current $I_{ref}$ of the inverter (step S608). If it is determined that the actual load is factor $I_o/I_{ref}$ is not greater than the reference load factor, it returns to step S602 without performing a trip control process. On the other hand, if it is determined in step S608 that the actual load factor $I_o/I_{ref}$ is greater than the reference load factor, which means that the inverter overheats, an overload current measurement time t is compared with a compensation reference time $t_{ref}+t_c$ (step S610), such that trip control is performed.

According to the embodiment shown in FIG. 6, as described above with respect to FIG. 5, a change in temperature Δt of the inverter for an overload current measurement time period t is detected using the directly measured temperature of the inverter.

Then, the amount of heat Q emitted from the inverter for the overload current measurement time t may be calculated as follows:

$$Q[\text{cal}]=c\times m\times\Delta t \quad \text{[Mathematical Expression 3]}$$

where c denotes a specific heat of an inverter, m denotes a mass of an inverter, and Δt denotes a change in temperature of an inverter.

In addition, an electrical energy E consumed by an inverter for the overload current measurement time the may be calculated as follows:

$$E[J]=I_o^2\times R\times t \quad \text{[Mathematical Expression 4]}$$

where R denotes a resistance of an inverter.

According to the embodiment of the present disclosure, a compensation time $t_c$ can be calculated based on the actual amount Q of heat emitted from the inverter for the overload current measurement time t and the calculated electrical energy E as follows:

$$t_c=(E-Q)/(C\times I_o^2) \quad \text{[Mathematical Expression 5]}$$

where C denotes a proportional constant. In order to obtain a difference between the calculated electrical energy E of the inverter and the actual amount of heat emitted from the inverter, i.e., E−Q, the unit of the amount Q of heat may be converted into the unit of the electrical energy E or vice versa based on relationships such as 1 J=0.24 cal or 1 cal=4.186 J.

After calculating the compensation time $t_c$, the compensation time $t_c$ is added to the trip point reference time $t_{ref}$ to obtain a compensation reference time $t_{ref}+t_c$ (see Equation 1). Then, the calculated compensation reference time $t_{ref}+t_c$ is compared to the overload current measurement time the, thereby determining whether to trip the inverter (step S610). That is, if the overload current measurement time t is greater than the compensation reference time $t_{ref}+t_c$, it is determined that the inverter overheats, and thus the inverter is interrupted (step S612). Otherwise, the process returns to step S602.

As such, according to the embodiment of the present disclosure, the trip point reference time $t_{ref}$ is compensated based on the difference between the calculated electrical energy E of the inverter and the actual amount Q of heat emitted from the inverter for the overload current measurement time t. As a result, the trip point of the inverter can be controlled more precisely than in the related art.

Figure 7:
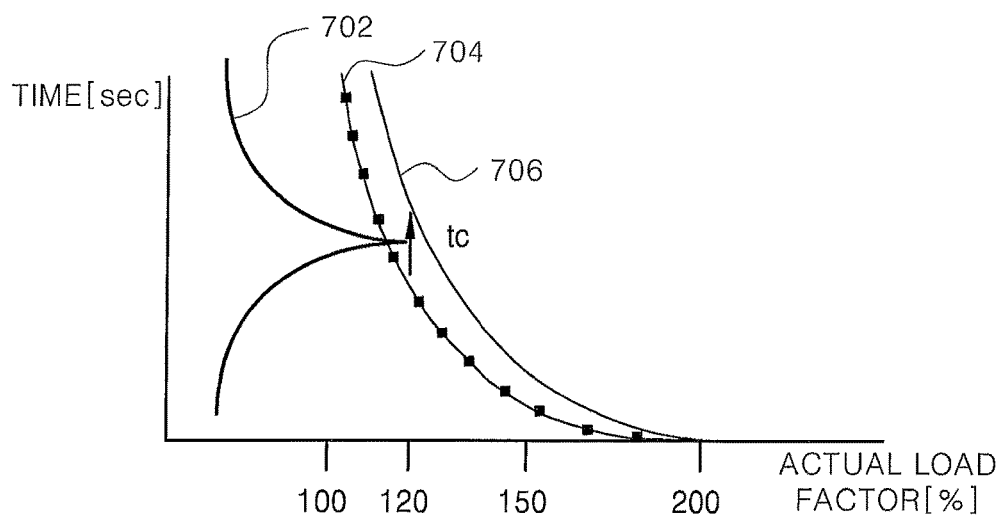
FIG. 7 is a graph showing movement of trip points when the actual amount of heat emitted from the inverter for the overload current measurement time is smaller than the calculated electrical energy based on the measured current according to an embodiment of the present disclosure.

FIG. 7 is a graph showing movement of trip points when the actual amount of heat emitted from the inverter for the overload current measurement time is smaller than the calculated electrical energy based on the measured current according to the embodiment of the present disclosure.

As described above, according to the embodiment of the present disclosure, the trip point reference time $t_{ref}$ is compensated based on the difference between the calculated electrical energy E of the inverter and the actual amount Q of heat emitted from the inverter, and, as a result, trip points of the inverter is adjusted. For example, if the actual amount Q of heat emitted from the inverter is smaller than the calculated electrical energy E, the compensation time $t_c$ becomes a positive value. Accordingly, the compensation reference time $t_{ref}+t_c$ becomes larger than the trip point reference time $t_{ref}$. When this happens, a curve 706 of the compensated trip point reference time moves to the right hand of a curve 704 of an original trip point reference time, as shown in FIG. 7. As a result, a signal 702, which is determined to be an overload signal with respect to the original curve 704, is not determined to be an overload signal with respect to the new curve 706. As a result, according to the embodiment of the present disclosure, if the actual amount Q of heat emitted from the inverter is smaller than the calculated electrical energy E, it is possible to reduce the number of unnecessary trip events caused by erroneous temperature information even though the temperature of the inverter is in the normal range.

Figure 8:
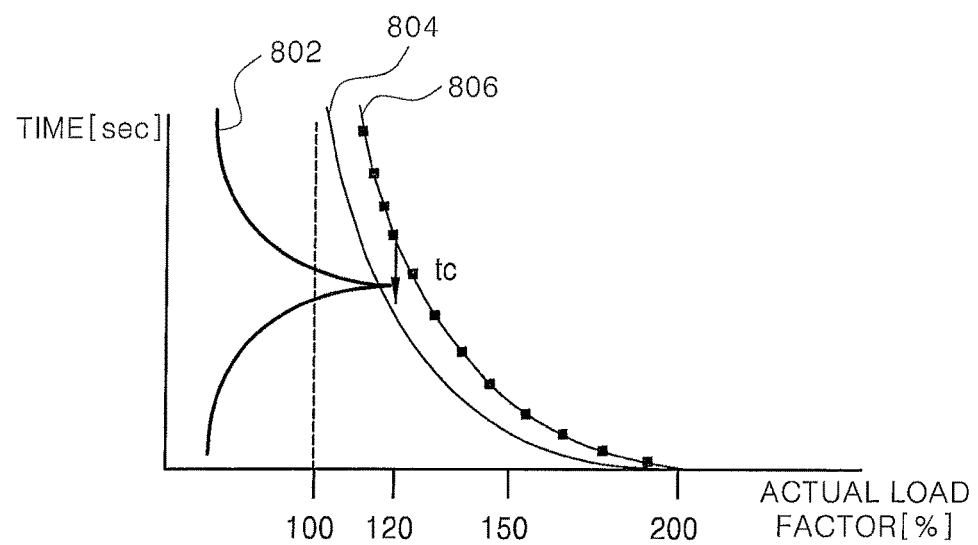
FIG. 8 is a graph showing movement of trip points when a reference of overheating based on temperature information of the inverter for the overload current measurement time is larger than a reference of overheating based on output current information according to an embodiment of the present disclosure.

FIG. 8 is a graph showing movement of trip points when a reference of overheating based on temperature information of the inverter for the overload current measurement time is larger than a reference of overheating based on output current information according to the embodiment of the present disclosure.

Contrary to FIG. 7, if the actual amount Q of heat emitted from the inverter is larger than the calculated electrical energy E, the compensation time $t_c$ becomes a negative value. Accordingly, the compensation reference time $t_{ref}+t_c$ becomes smaller than the trip point reference time $t_{ref}$. When this happens, a curve 804 of the compensated trip point reference time moves to the left hand of a curve 806 of an original trip point reference time, as shown in FIG. 8. As a result, a signal 802, which is not determined to be an overload signal with respect to the original curve 806, is determined to be an overload signal with respect to the new curve 804. As a result, according to the embodiment of the present disclosure, if the actual amount Q of heat emitted from the inverter is larger than the calculated electrical energy E, it is possible to prevent damage to the inverter and failure of the device caused when the overheating inverter is erroneously determined to be operating normally according to the method in the related art.

According to embodiments of the present disclosure, an actual temperature of the inverter measured when the inverter is in operation is reflected, so that the trip event of the inverter can be controlled more accurately.

In addition, according to embodiments of the present disclosure, trip points of an inverter can be improved, so that unnecessary trip events can be reduced and trip points can be earlier, thereby preventing damage to the inverter when the inverter is overheating.

The present disclosure described above may be variously substituted, altered, and modified by those skilled in the art to which the present disclosure pertains without departing from the scope and spirit of the present disclosure. Therefore, the present disclosure is not limited to the above-mentioned embodiments and the accompanying drawings.

What is claimed is:

1. A method for controlling a trip event of an inverter, the inverter comprising a switching element and a temperature sensing circuit, wherein the method comprises:
    sensing a change in temperature of the inverter for an overload current measurement time using the temperature sensing circuit;
    determining an amount of heat emitted from the inverter based on the change in temperature;
    determining an electrical energy of the inverter consumed for the overload current measurement time;
    determining a compensation reference time based on the amount of heat and the electrical energy; and
    comparing the compensation reference time with the overload current measurement time to trip the inverter, wherein the compensation reference time is determined by adding a compensation time to a trip point reference time.

2. The method of claim 1, wherein the compensation reference time is determined by:

$$t_c=(E-Q)/(C \times I_o^2)$$

wherein $t_c$ denotes the compensation time, Q denotes the amount of heat, E denotes the electrical energy, C denotes a proportional constant, and $I_o$ denotes an output current flowing in the switching element.

3. The method of claim 1, wherein the trip point reference time is determined by:

$$t_{ref}=E_{ref}/(C \times I_o^2)$$

wherein $t_{ref}$ denotes the trip point reference time, $E_{ref}$ denotes a reference energy for determining whether to trip the inverter, C denotes a proportional constant, and $I_o$ denotes an output current flowing in the switching element.

4. The method of claim 1, wherein the temperature sensing circuit comprises:
    a first resistor and a second resistor connected in series; and
    a third resistor connected to the second resistor in parallel.

5. The method of claim 4, wherein the third resistor is a variable resistor having a resistance inversely proportional to the temperature of the inverter.

6. The method of claim 1, further comprising:
    calculating an actual load factor based on a ratio of an output current flowing in the switching element to a rated current of the inverter;
    comparing the actual load factor with a reference load factor; and
    determining whether to trip the inverter based on a result of the comparing.

7. The method of claim 6, further comprising:
    comparing a switching frequency of the switching element with a reference frequency; and
    determining whether to interpolate the reference load factor based on a result of the comparing.

* * * * *